United States Patent
Krökel

(10) Patent No.: US 8,872,918 B2
(45) Date of Patent: Oct. 28, 2014

(54) METHOD FOR EXPOSURE CONTROL FOR A CAMERA IN A MOTOR VEHICLE

(75) Inventor: Dieter Krökel, Eriskirch (DE)

(73) Assignee: ADC Automotive Distance Control Systems GmbH (DE)

( * ) Notice: Subject to any disclaimer, the term of this patent is extended or adjusted under 35 U.S.C. 154(b) by 1030 days.

(21) Appl. No.: 12/990,567

(22) PCT Filed: Apr. 27, 2009

(86) PCT No.: PCT/DE2009/000579
§ 371 (c)(1),
(2), (4) Date: Jan. 14, 2011

(87) PCT Pub. No.: WO2009/135460
PCT Pub. Date: Nov. 12, 2009

(65) Prior Publication Data
US 2011/0157362 A1    Jun. 30, 2011

(30) Foreign Application Priority Data

May 3, 2008 (DE) .................... 10 2008 022 064

(51) Int. Cl.
*H04N 7/18* (2006.01)
*H04N 9/47* (2006.01)
*H04N 5/235* (2006.01)

(52) U.S. Cl.
CPC ........ *H04N 5/2353* (2013.01); *B60R 2300/105* (2013.01)
USPC ...................................................... 348/148

(58) Field of Classification Search
CPC .... B60R 1/00; B60R 2300/105; B60R 11/04; B60R 2300/802; H04N 7/181
USPC .......................................................... 348/148
See application file for complete search history.

(56) References Cited

U.S. PATENT DOCUMENTS

| | | | |
|---|---|---|---|
| 2004/0227814 A1* | 11/2004 | Choi | 348/148 |
| 2006/0125919 A1* | 6/2006 | Camilleri et al. | 348/148 |
| 2006/0203092 A1* | 9/2006 | Nobori et al. | 348/148 |
| 2008/0042812 A1* | 2/2008 | Dunsmoir et al. | 340/435 |
| 2008/0137908 A1* | 6/2008 | Stein et al. | 382/103 |

FOREIGN PATENT DOCUMENTS

| | | |
|---|---|---|
| EP | 1 883 242 A1 | 1/2008 |
| EP | 1 883 242 A2 | 1/2008 |
| EP | 19 64 718 A2 | 9/2008 |

* cited by examiner

*Primary Examiner* — Andy Rao
*Assistant Examiner* — Jared Walker
(74) *Attorney, Agent, or Firm* — RatnerPrestia

(57) ABSTRACT

A method for exposure control for a camera system in a motor vehicle is provided. The camera system records a sequence of images of the surroundings of the vehicle using an optimal exposure time. The optimal exposure time is predetermined depending on the brightness of the surroundings or on the brightness of individual objects in the image. If the optimal exposure time is longer than a predetermined threshold value, at least one intermediate image is recorded using a short predetermined exposure time, i.e. an exposure time shorter than the optimal exposure time. At least two driver assistance functions are executed on the basis of the image data of the camera system. The image data recorded using the optimal exposure time is used for a first driver assistance system and the image data recorded using the short exposure time is used for a second driver assistance system.

11 Claims, 2 Drawing Sheets

METHOD FOR EXPOSURE CONTROL FOR A CAMERA IN A MOTOR VEHICLE

CROSS REFERENCE TO RELATED APPLICATIONS

This application is the U.S. national phase application of PCT International Phase Application No. PCT/DE2009/000579, filed Apr. 27, 2009, which claims priority to German Patent Application No. 10 2008 022 064 7, filed May 3, 2008, the contents of such applications being incorporated by reference herein.

FIELD OF THE INVENTION

The invention relates to a method for exposure control for a camera in a motor vehicle and is applied, for example, in vehicles that are equipped with driver assistance functions.

An optimally illuminated image is the prerequisite for the reliable and perfect detection of objects and is important for the reliability of a driver assistance system.

BACKGROUND OF THE INVENTION

US 2004/0227814 A1, which is incorporated herein by reference, shows a double exposure method for a camera system of a vehicle that synthesizes first and second images obtained using different exposure times.

DE 102006028624 A1, which is incorporated herein by reference, shows an exposure-adaptive image sensor with a control device, said control device enabling the integration time to be reduced effectively.

The synthesis of two images that were recorded at different times results in the blurring of objects that change their positions quickly.

If illumination is insufficient, a reduced integration time may result in objects or markings that are poor in contrast and, as a result, cannot be reliably detected any more.

SUMMARY OF THE INVENTION

It is therefore an object of the present invention to provide a method for exposure of a camera, said method enabling objects to be reliably detected.

According to aspects of the invention, an object of the invention is achieved by a device and a method described herein.

A method for exposure control for a camera system in a motor vehicle is provided. The camera system records a sequence of images of the surroundings of the vehicle using an optimal exposure time. The optimal exposure time is predetermined in dependence on the brightness of the surroundings or on the brightness of individual objects in the image. In addition, the exposure time may depend on a provided application, e.g. a driver assistance function.

Moreover, an intermediate image is recorded using a short exposure time, i.e. an exposure time shorter than the optimal exposure time, if the optimal exposure time is longer than a predetermined threshold value.

At least two driver assistance functions are executed on the basis of the image data of the camera system, wherein the image data recorded using the optimal exposure time is used for a first driver assistance system and the image data recorded using the short exposure time is used for a second driver assistance system.

In one exemplary embodiment of the invention, the predetermined threshold value depends on the speed of the motor vehicle. In some embodiments of the present invention a small threshold value is selected when the speed is high. For example, the interrelationship between the predetermined threshold value and the speed is inversely proportional or follows a step function.

In another exemplary embodiment of the invention, images are recorded using short and long exposure times in an alternating manner.

In another exemplary embodiment of the invention, the method is used in a camera system for traffic sign recognition and, as the case may be, for a further driver assistance function.

In the following, the invention is explained on the basis of exemplary embodiments with the driver assistance functions A, B and C and figures. Driver assistance function A is a lane detection function, for example. Driver assistance function B is a light control function, for example. Driver assistance function C is a traffic sign recognition function, for example.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

During the day, applications like lane detection (SpE) and traffic sign recognition (VZE) make similar demands on exposure control: moderate demands on the dynamic range of the image sensor in the sunshine and when there is hard shadow, and high demands on the dynamic range when a vehicle enters and leaves a tunnel, for example, wherein the highest possible contrast for lane detection is to be maintained.

The night represents the other extreme for exposure control. An exposure time that is as long as possible is required for lane detection. The dynamic range must be very high in order to prevent the headlights of oncoming vehicles from causing undesirable dazzle. For applications running at night, e.g. high beam assistance (FLA), exposure must be adjusted in such a manner that no objects except for oncoming vehicles cause the saturation of the image sensor. On the other hand, the exposure time for traffic sign recognition must not become too long when the speed is high, since otherwise the meaning of the traffic sign, e.g. a speed limit, cannot be clearly identified any more on account of the motion blur.

The guide value for the exposure time for avoiding the motion blur is 5 ms at a speed of 200 km/h. The conflicting demands for lane detection and traffic sign recognition at dawn/dusk and at night require a solution, which solution is explained in the following.

As a first exemplary embodiment, a method is described in which, above a predetermined speed of the motor vehicle and above a predetermined exposure time for traffic sign recognition, a second image is recorded using a short exposure time.

The exposure time for the traffic signs at night may be reduced, since the traffic signs reflect the light of the headlights at least partially and thus reflect much more light of the headlights than the asphalt of the road, for example. Even with a reduced exposure time, the traffic signs are still visible for the camera with sufficient contrast. As a rule, the refresh rate is constant for all applications, e.g. 25 Hz.

Figure 1:
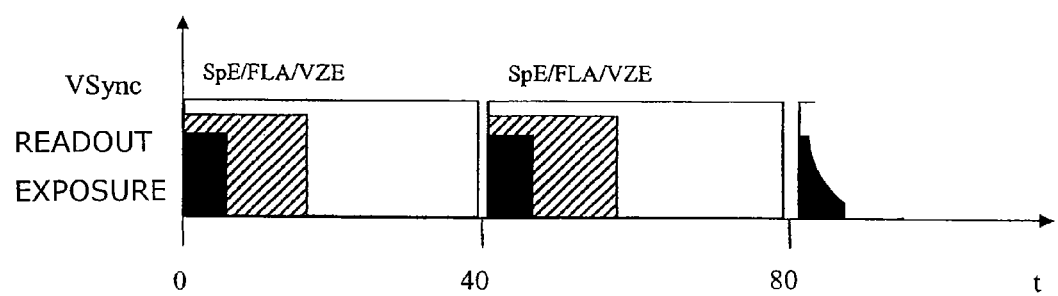
FIG. 1 shows a time-dependency diagram with a constant refresh rate and an exposure time shorter than a predetermined threshold value, e.g. shorter than 5 ms.

FIG. 1 shows a time-dependency diagram with a constant refresh rate and an exposure time shorter than a predetermined threshold value, e.g. shorter than 5 ms. The hatched area represents the readout time that runs parallel to exposure. During the readout time, the image recorded in the previous cycle is read out.

It is provided that, if an exposure time longer than a predetermined threshold value, e.g. longer than 5 ms, becomes necessary, a second image may be recorded (using a short exposure time, shorter than the predetermined threshold value, e.g. 5 ms) within the available time window (40 ms per image with a refresh rate of 25 frames per second) in order to additionally generate an image that is not distorted by motion blur. With this approach, the readout time of the image must be considerably shorter than the available time window (e.g. 15 ms with 25 frames per second), thereby enabling the first frame to be reduced to 25 ms and a second frame of 15 ms to be inserted, for example.

Figure 2:
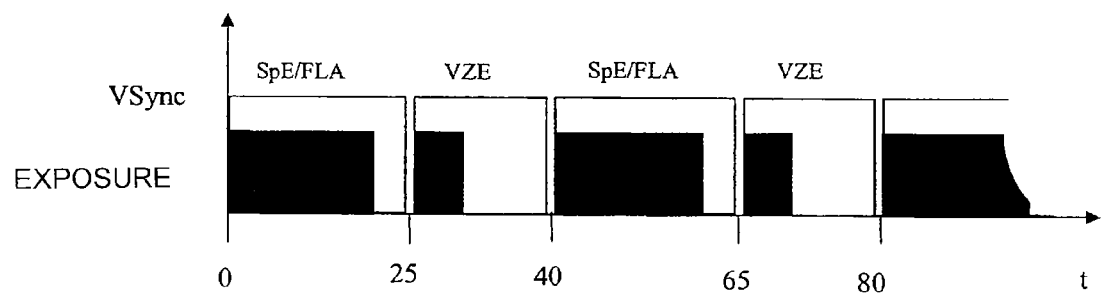
FIG. 2 shows a time-dependency diagram with a sequence of images exposed using long and short exposure times in an alternating manner.

So the refresh rate is doubled for exposure times longer than a predetermined threshold value (e.g. 5 ms), wherein images are recorded for lane detection or high beam assistance and traffic sign recognition in an alternating manner. FIG. 2 illustrates the chronological order of the method with an exposure time of 20 ms for the first frame and 5 ms for the second frame, for example.

Figure 3:
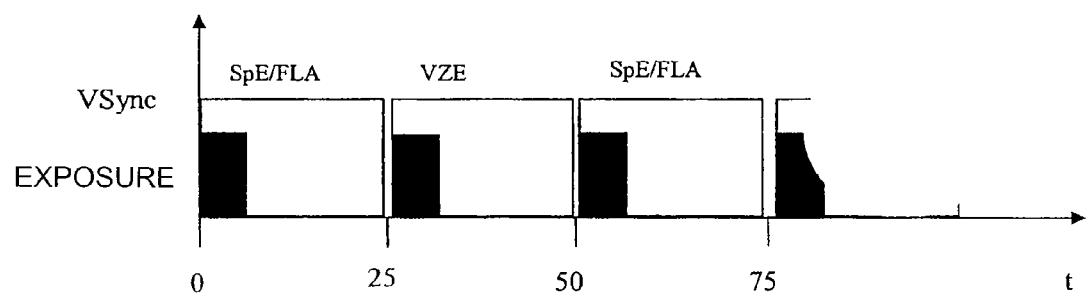
FIG. 3 shows a time-dependency diagram for an exposure time shorter than a predetermined threshold value, and simplified synchronization.
Figure 4:
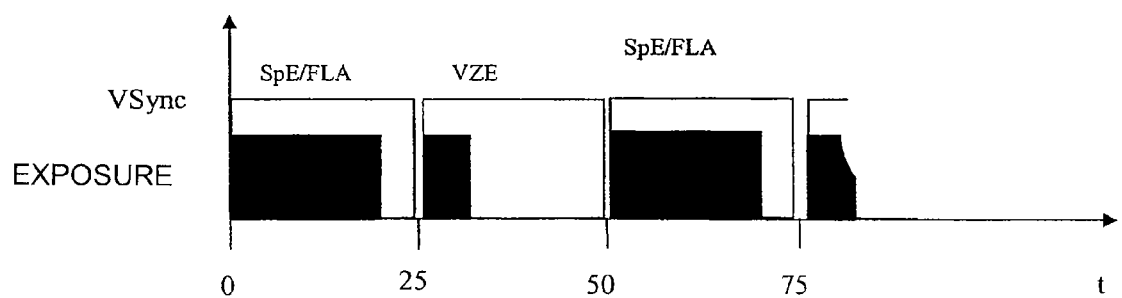
FIG. 4 shows a time-dependency diagram with a sequence of images exposed using long and short exposure times in an alternating manner, and simplified synchronization.

A second exemplary embodiment represents a method with a simplified synchronization demand on clocking and on image evaluation. Both frames have the same length. An extended clock rate might be necessary in dependence on the respective application. FIG. 3 illustrates the chronological order of the method with an exposure time shorter than a predetermined threshold value. If the exposure time is shorter than 5 ms, the exposure of both frames may be controlled in the same manner. With the surroundings getting darker and the required exposure time getting longer, the exposure time for the VZE frame is now kept short (e.g. 5 ms), which is shown in FIG. 4. The short exposure time may be determined in dependence on the speed of the vehicle. So the exposure time may be extended (to max. 25 ms, see FIG. 4) for low speeds in order to generate an image with a higher contrast and without motion blur. For example, the interrelationship between the exposure time for the image exposed using a short exposure time and the speed is inversely proportional or follows a step function. As an alternative, a predetermined short exposure time (e.g. 5 ms) may be provided.

The invention claimed is:

1. A method for exposure control for a camera system in a motor vehicle, the method comprising:
   recording, by the camera system, a sequence of images of the surroundings of the vehicle using an optimal exposure time which is predetermined in dependence on the brightness of the surroundings or on the brightness of individual objects in the image, each of the images being recorded during a respective refresh time;
   if the optimal exposure time is longer than a predetermined threshold value for avoiding motion blur in the images:
      reducing each respective refresh time to include a first refresh time and a second refresh time;
      recording a first image during the first refresh time and a second image during the second refresh time, the first image is recorded using a first exposure time, and the second image is recorded using a second exposure time which is shorter than the first exposure time; and
   executing at least two driver assistance functions on the basis of the first image and the second image of the camera system,
   wherein the first image is used for a first driver assistance system and the second image is used for a second driver assistance system.

2. The method of claim 1, wherein the predetermined threshold value depends on the speed of the motor vehicle.

3. The method of claim 1, wherein images are recorded using short and long exposure times in an alternating manner.

4. The method of claim 1, wherein the first driver assistance system is a lane detection system or a high beam assistance system.

5. The method of claim 1, wherein the second driver assistance system is a traffic sign recognition system.

6. The method of claim 5, wherein the image data recorded using the short exposure time is used for traffic sign recognition at night.

7. The method of claim 1, wherein images are recorded for lane detection or high beam assistance and traffic sign recognition in an alternating manner.

8. The method of claim 1, wherein a refresh rate is constant for all driver assistance systems.

9. The method of claim 1, wherein the interrelationship between the exposure time for the image exposed using a short exposure time and the speed of the motor vehicle is inversely proportional.

10. A camera system capable of storing and executing the method of claim 1.

11. A motor vehicle with a camera system of claim 10.

* * * * *